June 5, 1945.  G. E. DUNN  2,377,408
UNIVERSAL JOINT
Filed Nov. 4, 1942  3 Sheets-Sheet 1
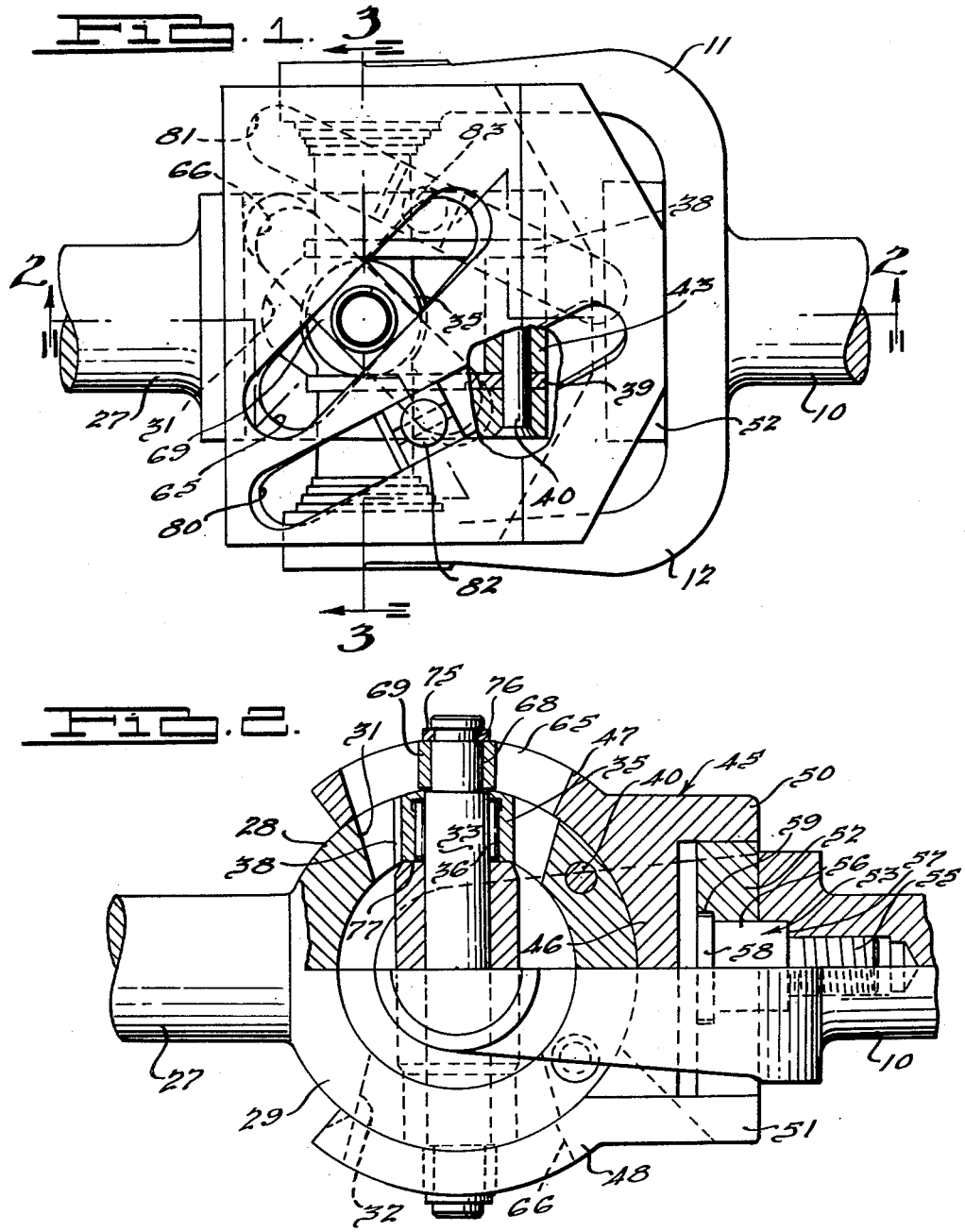
INVENTOR
George E. Dunn.
BY
ATTORNEYS.

June 5, 1945.　　　G. E. DUNN　　　2,377,408
UNIVERSAL JOINT
Filed Nov. 4, 1942　　　3 Sheets-Sheet 2
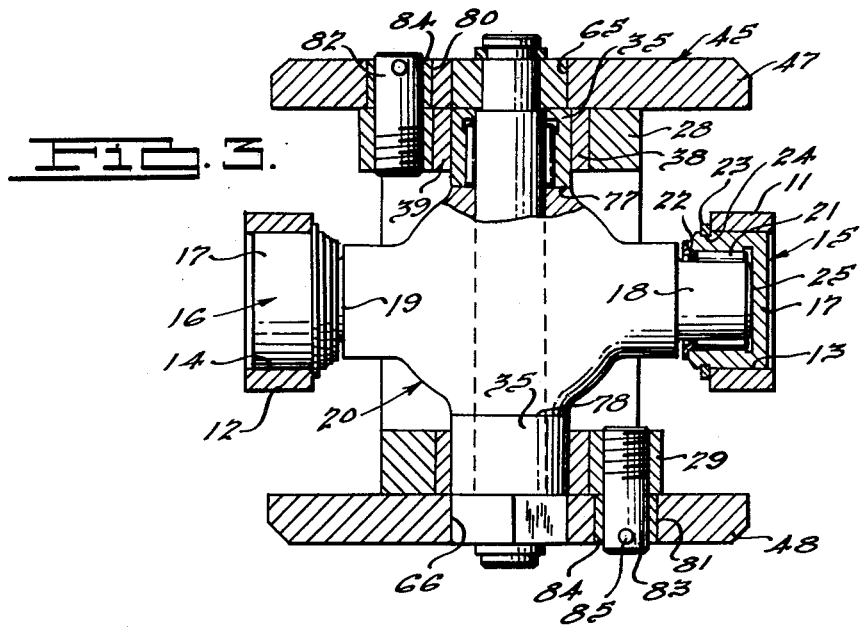
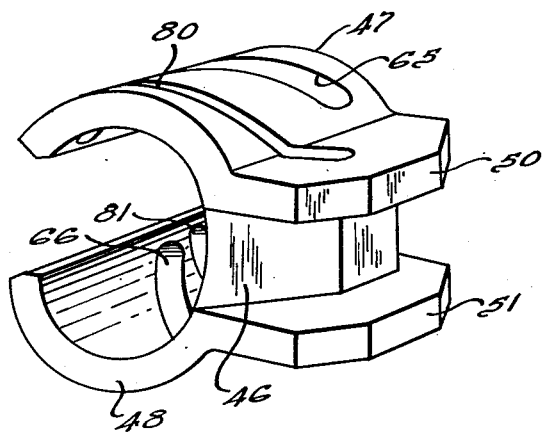
INVENTOR
George E. Dunn.
BY
Harness Dickey & Pierce
ATTORNEYS.

June 5, 1945.  G. E. DUNN  2,377,408
UNIVERSAL JOINT
Filed Nov. 4, 1942  3 Sheets-Sheet 3

INVENTOR
George E. Dunn.
BY
Harness, Dickey & Pierce.
ATTORNEYS.

Patented June 5, 1945

2,377,408

UNITED STATES PATENT OFFICE 2,377,408

UNIVERSAL JOINT

George E. Dunn, Dearborn, Mich., assignor to Universal Products Company Incorporated, Dearborn, Mich., a corporation of Delaware Application November 4, 1942, Serial No. 464,491

15 Claims. (Cl. 64—21)

The invention relates generally to universal joints and it has particular relation to a universal joint of constant velocity character.

One object of the present invention is to provide an improved universal joint of constant velocity character wherein lubrication of the joint is simplified through location of the bearing surfaces outwardly from the center of rotation so as to minimize disadvantages of lubricant being thrown away from bearing surfaces through the action of centrifugal forces.

Another object of the invention is to provide a universal joint of the aforesaid character wherein the bearing surfaces are so located towards the outer sides of the joint as to facilitate application of lubricant.

Another object of the invention is to provide a constant velocity joint employing improved means for shifting a member connecting the shafts to an angle bisecting position.

Another object of the invention is to provide a constant velocity universal joint employing a cross wherein efficient and durable means are provided for swinging the cross into an angle bisecting position when the shaft members are tilted relatively.

Another object of the invention is to provide a constant velocity universal joint which may be manufactured inexpensively and assembled easily.

Other objects of the invention will become apparent from the following specification, drawings relating thereto and from the appended claims.

For a better understanding of the invention, reference may be had to the drawings wherein:

Figure 1 is a plan view partly in cross-section illustrating a universal joint constructed according to one form of the invention;

Fig. 2 is a cross-sectional view taken substantially along the line 2—2 of Fig. 1;

Fig. 3 is a cross-sectional view taken substantially along the line 3—3 of Fig. 1;

Fig. 4 is a view of a bisecting member employed in the joint as seen when separated from the other parts;

Figure 5:
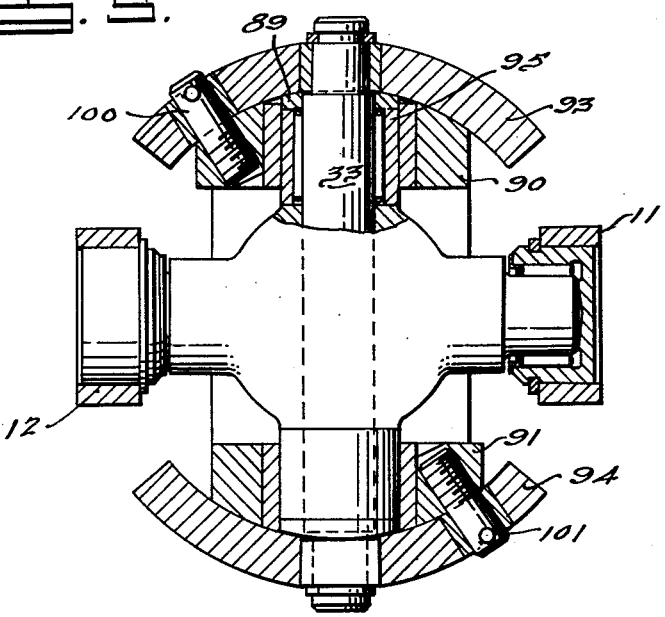
Fig. 5 is a cross-sectional view of another form of the invention.
Figure 6:
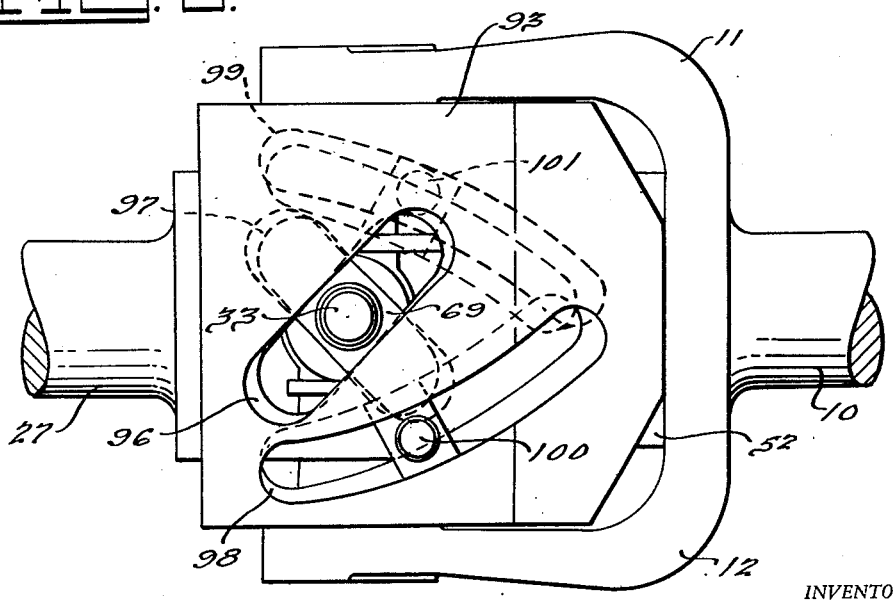
Fig. 6 is a plan view of the structure shown by Fig. 5.

Referring to Figures 1, 2, and 3, the joint includes a shaft member 10 having yoke arms 11 and 12 which, as shown by Fig. 3, are provided with diametrically aligned apertures 13 and 14, respectively. These apertures are diametrically aligned and respectively receive bearing assemblies 15 and 16. A bearing assembly in each aperture includes a cup 17 and such cup is mounted on opposed, diametrically aligned trunnions 18 and 19 forming part of a cross 20. Rollers 21 are provided between each trunnion and the side wall of the bearing cup thereon and an annular ring 22 may be pressfitted into the inner or open end of each cup to hold the rollers in position. A split ring 23 located in a groove 24 in the outer wall of the cup substantially engages the inner side of each yoke arm so as to radially locate the bearing cup. The base portion of each cup substantially engages the outer end face of the trunnion therein as indicated at 25 and from this it follows that the cross is centered between the two yoke arms 11 and 12.

Referring now to Figs. 2 and 3 in particular, a second shaft member 27 is provided which has yoke arms 28 and 29 forming sectors of a cylinder. These arms respectively have axially arranged slots 31 and 32 extending to the free end of the arms and a pin 33 disposed at right angles to trunnions 18 and 19 extends diametrically through the central body of the cross 20 and outwardly through the slots.

The pin is preferably press fitted in a diametrically extending opening in the body of the cross and its end portions project substantially equal distances from opposed sides of the body. Within each of the slots 31 and 32, a circular block 35 is provided on the projecting end of the pin and small needle or roller bearings 36 are arranged between the side wall of the block and the surface of the pin. In order to provide hard bearing surfaces for contact with the blocks 35, each of the slots 31 and 32 is provided with opposed metal bearing strips 38 and 39 constructed of hard or suitable bearing metal and these strips are curved in correspondence with the opposed side walls of the slots and fit thereagainst. A rivet pin 40 extends through openings in the bifurcated end of each of the yoke arms 28 and 29, through the bearing strips 38 and 39 and through a spacer element 43 located between the bifurcated ends of the yoke arms 28 and 29 and between the strips. The spacer element 43, in conjunction with the rivet pin 40, not only serves to connect the bifurcated parts at the end of each yoke arm but also serves to connect the outer end of one yoke arm to the outer end of the other yoke arm. Furthermore, it will be noted that the spacer element is curved so as to form a cylindrical sector corresponding to the cylindrical character of the yoke arms so that finally the two yoke arms and the spacer element form a complete cylinder. From this it will follow that the yoke arm assembly on the shaft member 27 is extremely strong while still providing slots 31 and 32 for the blocks 35.

It should now be understood from the foregoing that a cross is provided for connecting the two shaft members 10 and 27 and that in operation of the joint, torque loads from one shaft to the other are imparted through the trunnions on the cross. In other words if shaft member 10 is driven, the torque is imparted through the yoke arms 11 and 12 and trunnions 18 and 19, through the cross and then through slotted yoke arms 28 and 29 to the other shaft member. In order to have a constant velocity action, the cross must be shifted to bisecting position when the angularity of the shaft members 10 and 27 changes and means for accomplishing this result now will be described.

With references to Figures 2, 3, and 4, a bisecting member provided is indicated generally at 45 and it includes a base portion 46 and yoke arms 47 and 48 which are curved to form cylindrical sectors slidably fitting the outer surface of the yoke assembly on shaft member 27. It should be observed that the entire inner periphery of the bisector member 45 has a cylindrical surface and that this surface has cylindrical bearing surface engagement with not only the outer surfaces of the yoke arms 28 and 29 but also with the spacer member 43 extending between the ends of such yoke arms.

At the opposite side of the base portion 46 of the bisector, projections or arms 50 and 51 are provided which straddle a square or a circular collar 52 rotatably secured to the base portion of shaft member 10 between arms 11 and 12 by means of a screw 53. This screw has a threaded end 55 for securing it to the shaft member 10 and an enlarged cylindrical portion 56 seated in a recess 57 in the shaft member which serves as a bearing surface for the collar 52. Also, this enlarged portion limits tightening of the screw on the shaft member 10. An outer head 58 on the screw, which is located in an enlarged end of the opening in the collar 52 holds the collar against removal and it is to be understood that the parts are so arranged that the collar turnably but closely fits between the base surface of the shaft member 10 and the end 58 on the screw and that it closely but turnably fits on the enlarged portion 56 of the screw. The flat and parallel inner surfaces of arms 50 and 51 on the bisecting member have a close but sliding fit with the outer sides of the collar 52 and from this it follows that the bisecting member may turn about the axis of the shaft member 10 while being so related thereto that if the shaft member 10 is tilted relative to the shaft member 27 about the axis of trunnions 18 and 19, the bisector will tilt with it.

The two arms 47 and 48 of the bisector have slots 65 and 66 respectively and the outer ends of the pin 33 project outwardly through these slots. That portion of the pin at the outer side of each block 35 is of slightly reduced diameter as indicated at 68 and receives a square block 69 and such blocks slidably fit the slots. These blocks substantially contact the outer ends of the blocks 35, and it might be noted in this connection that the outer end faces of the blocks 35 are shaped substantially to fit the inner surfaces of the bisector arms or, in other words, the outer end faces of the rollers are substantially cylindrical in the direction of the cylindrical surfaces of the bisector arms. The blocks 69 are retained on the ends of the pin 33 by split locking rings 75, seated in grooves 76 formed in the ends of the pin outwardly of the outer surfaces of the bisector arms.

Centering of the bisector member relative to the cross may be effected through surface contact between blocks 35 and the inner faces of the bisector arms and through contact of the blocks with surfaces 77 and 78 on opposite sides of the cross body as seen best by Fig. 3. The yoke arms 28 and 29 are centered through their engagement with the inner surfaces of the bisector arms.

Additional slots 80 and 81 are provided respectively in the arms 47 and 48 of the bisector member, and, as best shown by Fig. 3, these slots respectively receive pins 82 and 83 threaded into the arms 28 and 29 on the shaft member 27. A bearing block 84 is provided in each of the apertures 80 and 81, and such blocks are mounted on the pins 82 and 83 and are slidable in the two slots. A cross pin 85 extending through the outer end of each pin and which is located in a groove in the wall of the block serves to retain the latter against outward movement.

Attention is now directed to the fact that the slots 65 and 66 are disposed in angular relation to the slots 31 and 32 and, as seen by plan view in Fig. 1, such slots 65 and 66 cross each other. In other words, the slot 65 crosses the axial slots 31 and 32 at an angle thereto in one direction, while the slot 66 at the opposite side of the joint crosses the slots 31 and 32 in a transverse direction to the slot 65.

The slots 80 and 81 in plan view, as seen in Fig. 1, also extend in angular relation to the other slots, and it will be observed that slot 80, for instance, is directed at an acute angle to the slots 31 and 32, while the opposite slot 81 is directed at a similar but opposite acute angle at the other side of the center line of the shaft. With respect to all of the slots, it is to be understood that the side walls will follow generally helical paths on the order of the side walls of a thread so as to accommodate the swinging movements of the blocks 69 and 84 and avoid binding between the sides of the blocks and the sides of the slots. Also, the side surfaces of the blocks may be contoured to generally fit the helically changing contour of the side walls of the slot so as to obtain large surface contact. A roller in place of each block could be used but it would obtain line contact instead of substantial surface contact. The design and purpose of these slots and the angularity thereof may best be appreciated from a description of the operation of the joint.

Assuming, in Figs. 1 and 2, that the shaft 27 is tilted upwardly with respect to the shaft 10, that is, tilted upwardly in the direction of the slots 31 and 32, the yoke arms 28 and 29 necessarily turn within the bisector member 45. As this turning occurs, the pin 82 on the top yoke arm 28 will move to the right and towards the right end of the slot 80, while the pin 83 on yoke arm 29 will move to the left and towards the left end of the slot 81. As this occurs, the bisector member 45 must shift downwardly, as seen in Figure 1. As the bisector shifts downwardly, the upper side of slot 65 engaging the block 69 on the end of pin 33 causes this block and the end of the pin to shift to the right, as seen in Fig. 1. At the same time, the shifting of the slot 66 downwardly at the opposite side of the joint causes the block on the end of the pin at that side to shift to the left, as seen in Fig. 1. From this, it follows that the pin 33, as seen in Fig. 2, will swing along with the upward swinging or tilting of shaft member 27, and in the same direction. The angularity of slots 80 and 81, however, is such, as compared to the angularity of slots 65 and 66, that the pin 33 is swung through an angle only half as great as the angle through which the shaft member 27 is swung. The result of this is to cause the cross to swing about the axis of trunnions 18 and 19 through such an angle that the pin 33 is disposed in a position where it bisects the angle between the shaft members 27 and 10. Hence, constant velocity operation may be obtained. Tilting of the shaft members 27 and 10 relatively in the opposite direction as, for instance, through tilting of shaft 27 downwardly, as seen in Fig. 2, will effect an opposite swinging of pin 33, so as to obtain bisection of the angle in the same manner.

It is evident, as seen in Figs. 2 and 3, that after removal of the bearing assemblies 15 and 16, the trunnions may be withdrawn from openings 13 and 14 in yoke arms 11 and 12 by angling of the trunnions 18 and 19 in the openings and moving the yoke arms 11 and 12 along the trunnions sufficiently. Then shaft member 10 can be withdrawn axially. Following this, the pins 82, 83, and 33 can be removed and this allows lateral removal of the cross body, lateral separation of the yoke arms 28, 29 and bisector 45, and removal of bearing block assemblies 35, 35. Assembly of the joint is effected in a reverse manner.

It will be evident that the various parts are so designed that surfaces and openings may be readily formed through simplified manufacturing operations, such as through turning and broaching machines, and that such parts may be easily and rapidly assembled in manufacture. It will be apparent, too, that all bearing surfaces are located substantially away from the center of the joint, so that lubricants will not be so readily thrown away from the bearing surfaces through centrifugal action.

Furthermore, it will be evident that application of lubricants and examination of bearing surfaces is facilitated by reason of the location of the bearing surfaces as far outwardly as possible in the joint. It might be added that, normally, the joint may be located in a housing having lubricant therein, and in this manner, lubricant may reach the bearing surfaces during operation. Even with a housing, it will be appreciated, however, that the lubricant will tend to be thrown toward the outer side of the housing during operation, and, hence, location of the bearing surfaces outwardly from the center of the joint is definitely of great advantage, regardless of operating conditions.

Now referring to Figs. 4 and 5, the joint shown is substantially similar to that described but in this instance yoke arms 90 and 91 on the shaft 27 have spherical outer surfaces with the same center and radius and the bisector indicated at 92 has arms 93 and 94 slidably fitting the arms 90 and 91. In other words, the structure is like that already described excepting that instead of cylindrical surface contact between the bisector and the yoke on shaft 27, the contact is spherical with the center of the sphere on the axis of shaft 27. Instead of using bearing cups on the pin 33 such as the cups 35 in Fig. 3, sleeves 95 are employed in conjunction with an end collar 89, which has a spherical outer surface to fit the inner surface of the bisector.

The slots in the bisector are indicated at 96, 97, 98, and 99 and are generally the same as the slots 65, 66, 80, and 81 except for following a spherical curvature instead of cylindrical curvature. However, the slots 98 and 99 are on great circles of the sphere and in this connection, the pins on the bisector, indicated at 100 and 101, are disposed radially to the spherical surface of the yoke arms 90 and 91. In this design too, the side walls of the slots will follow helical paths to accommodate the swinging movement of the blocks 69 on the trunnions of the cross and the blocks 84. The blocks too may have side surfaces to obtain surface contact with the side walls of the slots although rollers could be used instead of blocks but in that case line contact instead of surface contact would be obtained with the side walls of the slots.

Movement of the bisector in this structure is a swinging movement to the left or right as seen in Fig. 5 instead of the lateral movement only which occurs in the structure shown by Fig. 3. It will be understood that the swinging movement of the bisector effects movement of the cross to a bisecting position when the shaft 27 is tilted and that in all general respects the two joints have a similar operation.

Disassembly is effected by first removing the bearing assemblies in yoke arms 11 and 12 and angling the cross to withdraw the trunnions from such yoke and to allow shaft 10 to be axially withdrawn. Then the pins 100, 101, and 33 are removed. This allows the cross to be withdrawn laterally and the sleeves 33 to be withdrawn radially. Then by swinging the bisector through 90° relative to the yoke arms 90 and 91, the bisector can be laterally separated from the yoke arms. Assembly may be effected in the reverse order.

Although more than one form of the invention has been illustrated and described in detail, it will be apparent to those skilled in the art that various modifications may be made without departing from the scope of the appended claims.

What is claimed is:

1. A constant velocity joint comprising a cross having its opposed trunnions disposed in diametrically aligned relation, a first shaft element having yoke arms provided with axially elongated slots receiving a first pair of opposed trunnions, a second shaft member having yoke arms provided with diametrically aligned openings receiving the other two trunnions in turnable relation thereto about an axis fixed relative to the arms, and means for swinging the cross into position where the axis of said first pair of trunnions bisects the angle between the shafts when one shaft member is tilted relative to the other in a direction longitudinally of the slots.

2. A constant velocity joint comprising a cross having its opposed trunnions disposed in diametrically aligned relation, a first shaft element having yoke arms provided with axially elongated slots receiving a first pair of opposed trunnions, a second shaft member having yoke arms provided with diametrically aligned openings receiving the other two trunnions in turnable relation thereto, and means including a member on the second shaft member and disposed radially outwardly of the arms on the first shaft member for swinging the cross into a position where the axis of said first pair of trunnions bisects the angle between the shaft members when one shaft member is tilted relative to the other in a direction longitudinally of the slots.

3. A constant velocity joint comprising a cross having its opposed trunnions disposed in diametrically aligned relation, a first shaft element having yoke arms provided with axially elongated slots receiving a first pair of opposed trunnions, a second shaft member having yoke arms provided with diametrically aligned openings receiving the other two trunnions in turnable relation thereto, and means including a yoke member on the second shaft member having its arms disposed externally of the arms on the first shaft member for swinging the cross into a position where the axis of said first pair of trunnions bisects the angle between the shafts when one shaft member is tilted relative to the other in a direction longitudinally of the slots.

4. A constant velocity joint comprising an intermediate body having a pair of diametrically aligned outwardly projecting trunnions, a first shaft member having yoke arms provided with axially elongated slots receiving the trunnions, a second shaft member, opposed bearing means connecting the second shaft member and intermediate body for relative turning about an axis transverse to the axis of the trunnions, and means including a member on the second shaft member and disposed radially outwardly of the arms on the first shaft member for swinging the intermediate body into a position where the axis of said pair of trunnions substantially bisects the angle between the shaft members when one shaft member is tilted relative to the other in a direction longitudinally of the slots.

5. A constant velocity joint comprising an intermediate body having a pair of diametrically aligned outwardly projecting trunnions, a first shaft member having yoke arms provided with axially elongated slots receiving the trunnions, a second shaft member, opposed bearing means connecting the second shaft member and intermediate body for relative turning about an axis transverse to the axis of the trunnions, and means including a yoke member on the second shaft member having arms disposed externally of the arms on the first shaft member for swinging the intermediate body into a position where the axis of said pair of trunnions substantially bisects the angle between the shaft members when one shaft member is tilted relative to the other in a direction longitudinally of the slots.

6. A constant velocity joint comprising an intermediate body, a first shaft member having yoke arms, means comprising an axially directed slot and a trunnion movable therein connecting each arm to the body with the two trunnions located in diametrically aligned relation, a second shaft member, opposed bearing means connecting the second shaft member and intermediate body for relative turning about an axis transverse to the axis of the first trunnions, and means including a member on the second shaft member and disposed radially outwardly of the arms on the first shaft member for swinging the intermediate body into a position where the axis of the trunnions substantially bisects the angle between the shaft members when one shaft member is tilted relative to the other in a direction longitudinally of the slots.

7. A constant velocity joint comprising an intermediate body having a pair of diametrically aligned outwardly projecting trunnions, a first shaft member having yoke arms provided with axially elongated slots receiving the trunnions, a second shaft member, opposed bearing means connecting the second shaft member and intermediate body for relative turning about an axis transverse to the axis of the trunnions, a second yoke member on the second shaft member having arms disposed externally of the yoke arms on the first shaft member, means mounting the second yoke member on the second shaft member so that the yoke member can turn about the axis of the second shaft member while being tiltable therewith about said transverse trunnion axis, and means interconnecting the intermediate body and first and second yokes for effecting swinging of the intermediate body about said transverse axis to a position where the axis of the trunnions substantially bisects the angle between the shaft members where one shaft member is tilted relative to the other in a direction axially of the slots.

8. A constant velocity joint comprising an intermediate body having a pair of diametrically aligned outwardly projecting trunnions, a first shaft member having yoke arms provided with axially elongated slots receiving the trunnions, a second shaft member, opposed bearing means connecting the second shaft member and intermediate body for relative turning about an axis transverse to the axis of the trunnions, a second yoke member on the second shaft member having arms disposed externally of the yoke arms on the first shaft member, and means operatively interconnecting the intermediate body and first and second yoke members for effecting swinging of the intermediate body about said transverse axis to a position where the axis of the trunnions substantially bisects the angle between the shaft members when one shaft member is tilted relative to the other in a direction axially of the slots.

9. A constant velocity joint comprising an intermediate body having a pair of diametrically aligned, outwardly projecting trunnions, a first shaft member having axially curved yoke arms provided with axially elongated slots receiving the trunnions, a second shaft member, opposed bearing means connecting the second shaft member and intermediate body for relative turning about an axis transverse to the axis of the trunnions, a second yoke member on the second shaft member having axially curved arms slidably fitting the curved arms of the first shaft member, and means interconnecting the yoke arms and intermediate body for effecting swinging of the trunnions along the slots when one shaft member is tilted relative to the other in a direction along the slots.

10. A constant velocity joint comprising an intermediate body having a pair of diametrically aligned, outwardly projecting trunnions, a first shaft member having axially curved yoke arms provided with axially elongated slots receiving the trunnions, a second shaft member, opposed bearing means connecting the second shaft member and intermediate body for relative turning about an axis transverse to the axis of the trunnions, a second yoke member on the second shaft member having axially curved arms slidably fitting the curved arms of the first shaft member, said arms on the second yoke member having slots arranged diagonally to the first slots and said trunnions having portions extending into the diagonally arranged slots, and means for effecting movement of the second yoke member transversely to the slots in the first mentioned yoke arms on the first shaft member when the latter is tilted relative to the second shaft member in a direction axially of the slots in said first mentioned yoke arms.

11. A constant velocity joint comprising an intermediate body having a pair of diametrically aligned, outwardly projecting trunnions, a first shaft member having axially curved yoke arms provided with axially elongated slots receiving the trunnions, a second shaft member, opposed bearing means connecting the second shaft member and intermediate body for relative turning about an axis transverse to the axis of the trunnions, a second yoke member on the second shaft member having axially curved arms slidably fitting the curved arms of the first shaft member, said arms on the second yoke member having slots arranged diagonally to the first slots and said first trunnions having portions extending into the diagonally arranged slots, said arms on the second yoke also having slots arranged diagonally to the first slots but at an angle differing from the angularity of the other diagonal slots, and means on the arms of the first shaft member and engaging the second mentioned diagonal slots for causing the second yoke member to be shifted transversely of the first slots when one shaft member is tilted relative to the other in a direction axially of the first slots, the arrangement of diagonal slots being such that shifting of the second yoke member effects swinging of the trunnions along the first slots to positions where they substantially bisect the angle between the two shaft members.

12. A constant velocity joint comprising an intermediate body having a pair of diametrically aligned, outwardly projecting first trunnions, a first shaft member having axially curved yoke arms provided with axially elongated slots receiving the trunnions, a second shaft member, opposed bearing means connecting the second shaft member and intermediate body for relative turning about an axis transverse to the axis of the trunnions, a second yoke member on the second shaft member having axially curved arms slidably fitting the outer surfaces of the curved arms of the first shaft member, said curved arms having slots arranged diagonally to the first slots and said trunnions having outer extensions located in the diagonal slots, and means operatively connecting the second yoke member to the first shaft member for causing the former to shift transversely to the first slots so as thereby to effect swinging of the trunnions along said first slots when one shaft member is tilted relative to the other in a direction along said first slots.

13. In a constant velocity joint, an intermediate body having a pair of diametrically aligned, outwardly projecting first trunnions, a first shaft member having axially curved yoke arms provided with axially extending slots receiving the trunnions, said trunnions extending outwardly beyond the outer side of the arms, a second shaft member, opposed bearing means connecting the second shaft member and intermediate body for relative turning about an axis transverse to the axis of the trunnions, and a second yoke member on the second shaft member having axially curved arms slidably fitting the outer surfaces of the first yoke arms and having slots receiving the extended portions of the trunnions.

14. A constant velocity joint comprising an intermediate body having a pair of diametrically aligned, outwardly projecting trunnions, a first shaft member having yoke arms provided with surfaces forming part of a sphere, the arms having axially elongated slots respectively receiving the trunnions, a second shaft member, opposed bearing means connecting the second shaft member and intermediate body for relative turning about an axis transverse to the axis of the trunnions, a second yoke member on the second shaft member having arms provided with spherical surfaces slidably fitting the spherical surfaces of the first arms, and means connecting the yoke arms and intermediate body for effecting swinging of the trunnions along the slots when one shaft member is tilted relative to the other in a direction along the slots.

15. A constant velocity joint comprising an intermediate body having a pair of diametrically aligned, outwardly projecting trunnions, a first shaft member having yoke arms provided with surfaces forming part of a sphere, the arms having axially elongated slots respectively receiving the trunnions, a second shaft member, opposed bearing means connecting the second shaft member and intermediate body for relative turning about an axis transverse to the axis of the trunnions, a second yoke member on the second shaft member having arms provided with spherical surfaces slidably fitting the spherical surfaces of the first arms, said arms on the second yoke member having slots arranged diagonally to the first slots and said trunnions having portions extending into the diagonally arranged slots, and means for effecting movement of the second yoke member transversely to the slots in the first mentioned yoke arms on the first shaft member when the latter is tilted relative to the second shaft member in a direction axially of the slots in said first mentioned yoke arms.

GEORGE E. DUNN.